US007352159B2

(12) United States Patent
Luo et al.

(10) Patent No.: US 7,352,159 B2
(45) Date of Patent: Apr. 1, 2008

(54) SYSTEM AND METHOD FOR MANAGING NEGATIVE VOLTAGE IN A POWER SUPPLY OVERVOLTAGE FAILURE EVENT

(75) Inventors: Shiguo Luo, Austin, TX (US); Leszek Brukwicz, Austin, TX (US); Merle Wood, Round Rock, TX (US); Guangyong Zhu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 425 days.

(21) Appl. No.: 11/112,250

(22) Filed: Apr. 22, 2005

(65) Prior Publication Data

US 2006/0238181 A1 Oct. 26, 2006

(51) Int. Cl.
*G05F 1/40* (2006.01)
(52) U.S. Cl. ...................................................... 323/282
(58) Field of Classification Search ................ 323/282, 323/283, 284, 285, 286, 351
See application file for complete search history.

(56) References Cited

U.S. PATENT DOCUMENTS

| 4,782,241 | A | | 11/1988 | Baker et al. ................... 307/66 |
| 5,541,500 | A | * | 7/1996 | Krahl ........................... 323/299 |
| 5,602,463 | A | | 2/1997 | Bendall et al. ............... 323/266 |
| 5,959,441 | A | | 9/1999 | Brown .......................... 323/282 |
| 6,028,755 | A | * | 2/2000 | Saeki et al. .................. 361/91.1 |
| 6,087,815 | A | | 7/2000 | Pfeifer et al. ................. 323/282 |
| 6,148,220 | A | | 11/2000 | Sharp et al. .................. 455/572 |
| 6,507,175 | B2 | | 1/2003 | Susak et al. .................. 323/235 |
| 6,757,526 | B1 | | 6/2004 | Sharp et al. ............. 455/127.1 |
| 6,801,027 | B2 | | 10/2004 | Hann et al. ................... 323/282 |
| 6,804,091 | B2 | | 10/2004 | Jenkins et al. ................. 361/18 |
| 6,847,197 | B2 | | 1/2005 | Susak et al. .................. 323/266 |
| 6,911,848 | B2 | | 6/2005 | Vinciarelli .................... 327/108 |
| 7,045,992 | B1 | * | 5/2006 | Silva et al. ................... 323/222 |
| 2004/0130307 | A1 | * | 7/2004 | Dequina et al. ............. 323/282 |
| 2005/0237044 | A1 | * | 10/2005 | Louvel et al. ............... 323/282 |
| 2006/0119326 | A1 | * | 6/2006 | Jiang ........................... 323/222 |

* cited by examiner

*Primary Examiner*—Adolf Berhane
(74) *Attorney, Agent, or Firm*—Hamilton & Terrile, LLP; Robert W. Holland

(57) ABSTRACT

A synchronous Buck voltage regulator accepts an input voltage to provide a regulated output voltage to an information handling system processing component, such as a CPU. Input voltage is regulated by a control MOSFET, a synchronous MOSFET and a regulator controller that controls the output by controlling the control and synchronous MOSFETs. The synchronous MOSFET handles overvoltage events output from the control MOSFET by interfacing an inductor-capacitor tank circuit to reduce the overvoltage. A negative voltage protection MOSFET driver associated with the regulator controller monitors for negative voltage events that result from the interfacing of the inductor-capacitor tank circuit and selectively decouples the inductor-capacitor tank circuit if the negative voltage event is associated with a predetermined condition. The negative voltage protection MOSFET driver maintains the interface of the inductor-capacitor tank circuit if the overvoltage event is associated with a failed control MOSFET.

20 Claims, 5 Drawing Sheets

SYSTEM AND METHOD FOR MANAGING NEGATIVE VOLTAGE IN A POWER SUPPLY OVERVOLTAGE FAILURE EVENT

BACKGROUND OF THE INVENTION

1. Field of the Invention

The present invention relates in general to the field of power conversion, and more particularly to a system and method for managing negative voltage in a power supply overvoltage failure event.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include a number of electronic components that are sensitive to alterations in the voltage supplied for the components to operate. Excessive positive or negative voltage surge events can cause catastrophic failure to the components. To provide appropriately regulated DC-DC voltage conversion for sensitive components, information handling systems typically have a number of synchronous Buck regulators. For instance, a typical portable information handling system will have at least seven such synchronous regulators providing different level voltage to components such as the CPU, ICH, DDR and hard disk driver. Synchronous Buck regulators control voltage with a control MOSFET, a synchronous MOSFET and an LC tank circuit under a regulator controller. For instance, in an overvoltage event, regardless of the overvoltage condition that induced the overvoltage event, the regulator controller turns on the synchronous MOSFET to rapidly discharge an output capacitor of the LC tank circuit and reduce the output voltage. Synchronous Buck regulators thus protect information handling systems from overvoltage events that occur as a result of any number of fault conditions, such as a short, changes in reference voltage, component aging or feedback loop disconnect.

One difficulty with synchronous Buck regulators is that, in some situations, the correction to an overvoltage event provided by the capacitor of the tank circuit results in a negative voltage output. For instance, when energy is already stored in the LC tank circuit, a low resistance exists in the synchronous MOSFET and/or the load on the regulator is relatively low, a relatively quick response of a negative voltage of 2 Volts or less may be reached. A negative voltage event can present as much destructive risk to hardware components as an overvoltage event and is not guarded against in a conventional synchronous Buck regulator. One solution to the risk of a negative voltage from a synchronous Buck regulator is to connect a power schottky diode across the output of the regulator to act as a reverse-polarity clamp. However, the use of a diode adds to the cost of an information handling system and takes up a considerable amount of printed circuit board area, such as on a motherboard. The use of the diode also adds to manufacturing cost and difficulty by adding another component to the manufacture process.

SUMMARY OF THE INVENTION

Therefore a need has arisen for a system and method which efficiently avoids excessive negative voltage events in a synchronous Buck regulator during correction of an overvoltage event.

In accordance with the present invention, a system and method are provided which substantially reduce the disadvantages and problems associated with previous methods and systems for managing negative voltages that result during an overvoltage event. If a negative voltage occurs during correction of an overvoltage by discharging the output capacitor and then the capacitor is selectively disengaged based on the type of overvoltage condition that caused the overvoltage event.

More specifically, a synchronous Buck regulator regulates voltage to information handling system components with a control MOSFET disposed between a voltage in and a voltage out and a synchronous MOSFET that selectively interfaces an LC tank circuit. For instance, an overvoltage event at the output voltage is corrected by turning on the synchronous MOSFET to discharge an output capacitor and thus reduce the output voltage. A negative voltage protection MOSFET driver detects if the correction to the overvoltage results in a negative voltage and determines whether to maintain the synchronous MOSFET on based on the condition that caused the overvoltage. If a predetermined condition caused the overvoltage event, such as a failed control MOSFET, the inductor-capacitor tank circuit interface with the output voltage remains by leaving the synchronous MOSFET on. If the overvoltage event is not caused by a failed control MOSFET, then upon detection of a negative voltage the synchronous MOSFET is turned off to prevent further decreases in the negative voltage. A failed control MOSFET manifests as a short and is thus is determined by a relatively small voltage drop across the control MOSFET, a comparison with ground, or other determination associated with a short condition across the control MOSFET.

The present invention provides a number of important technical advantages. One example of an important technical advantage is that excessive negative voltage is avoided in synchronous Buck regulators during an overvoltage event without adding other components, such as a diode, to the regulator output. Regulator controllers typically have IC pins that support readings of input voltage (Vin) and switch node (LX) voltage values and also have function to monitor voltage so that implementation of negative voltage protection adds no additional hardware such as a larger sized power diode and only minimal logic within the regulator controller. Regulator design is simplified, less costly and easier to manufacture with less space taken on an information handling system printed circuit board.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A synchronous Buck voltage regulator with negative voltage protection reduces the risk of damage to information handling system processing components from the inadvertent application of negative voltage. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
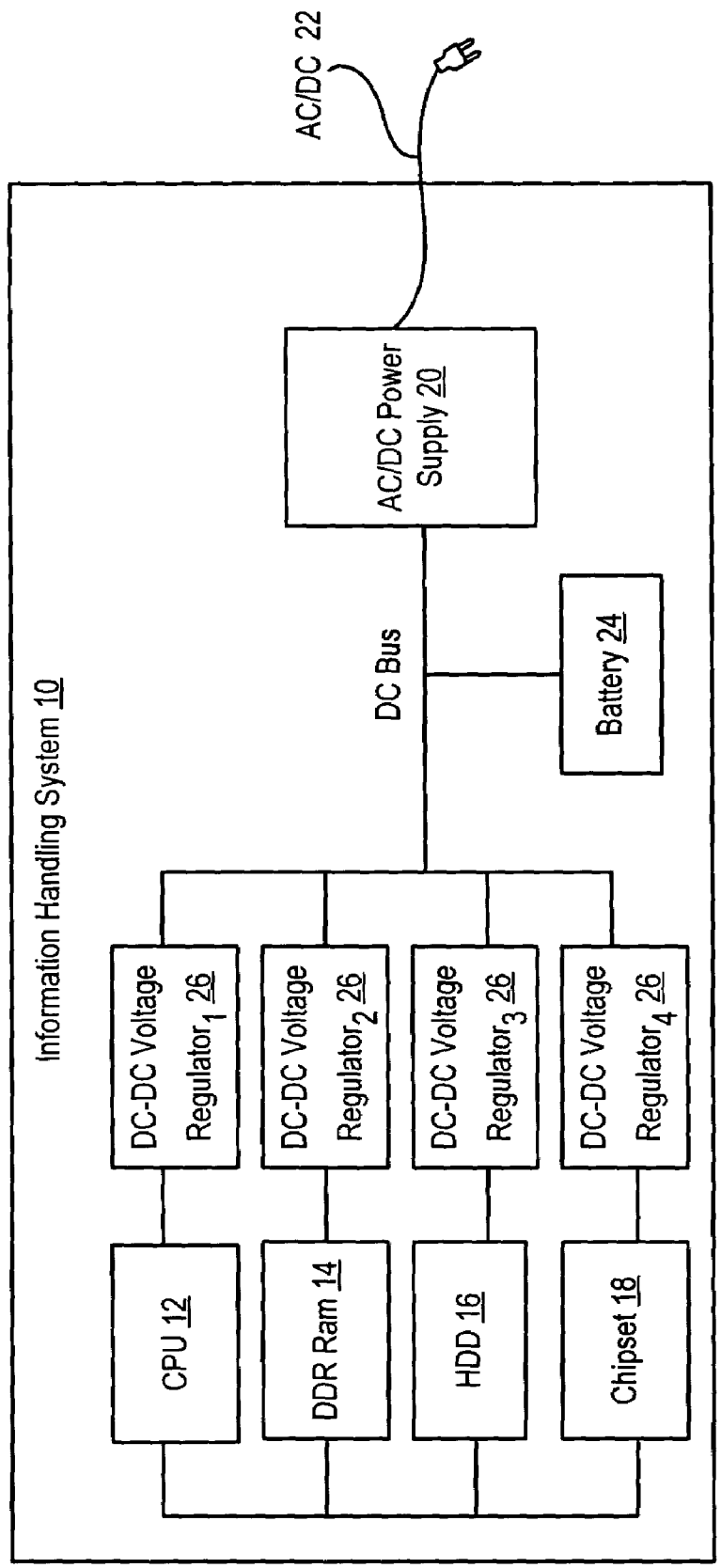
FIG. 1 depicts a block diagram of an information handling system having plural processing components with a typical power distribution architecture.

Referring now to FIG. 1, a block diagram depicts an information handling system 10 having plural processing components with a typical power distribution architecture. Information handling system 10 has a variety of processing components that cooperate with each other for processing information, such as a CPU 12, DDR RAM 14, a hard disk drive 16 and chipset 18 that supports functions such as the BIOS. External power to operate the processing components typically comes from an AC source 22, which is converted to DC by an internal or external AC/DC power supply 20. In addition, internal power is sometimes available from a battery 24, which is periodically charged by external power. The specific voltage requirements of particular components are managed by a DC-DC regulator 26 interfaced between each processing component and the power supply 20. Each regulator 26 may varying in its voltage regulation parameters as called for by the operating range of the component that each regulator protects. Synchronous Buck voltage regulators are commonly used to regulate voltage to components with protection against overvoltage events that could damage the components.

Figure 2:
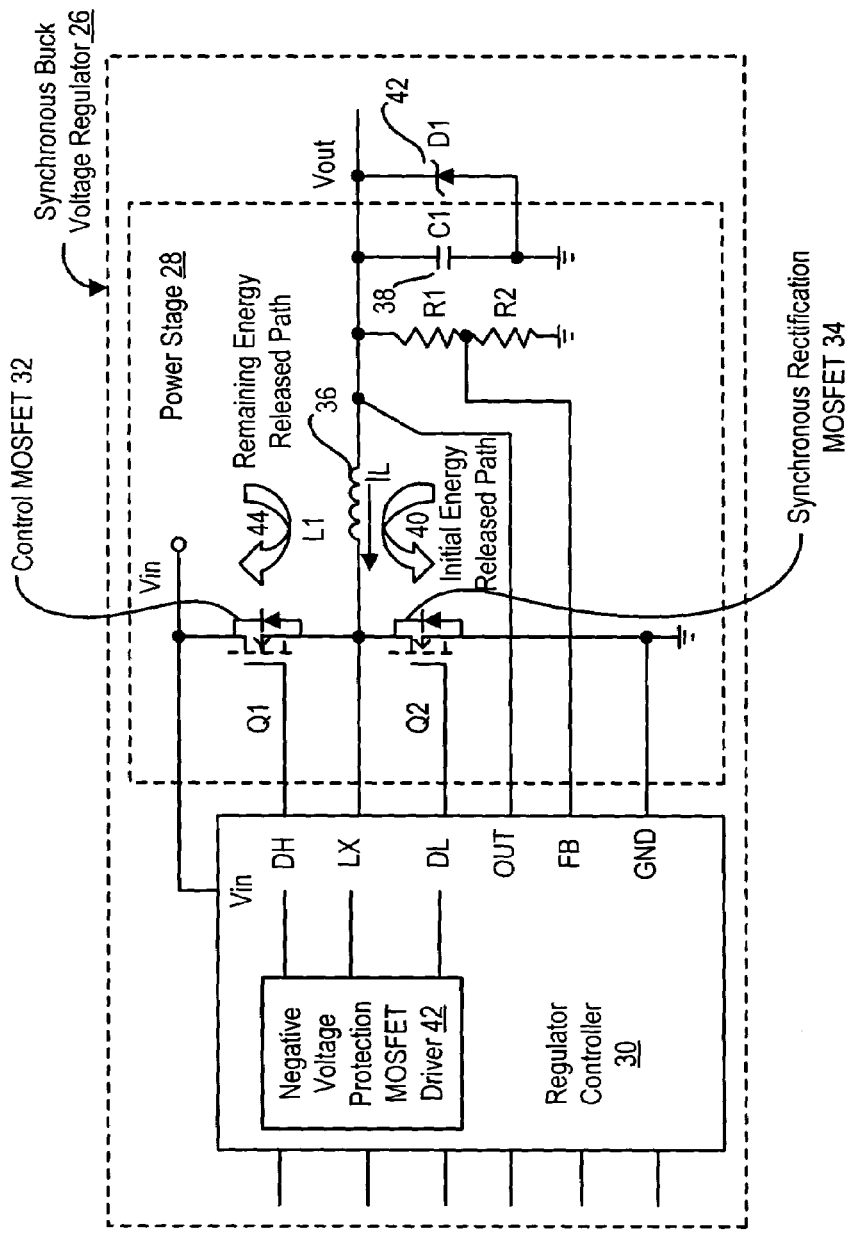
FIG. 2 depicts a circuit diagram of a synchronous Buck voltage regulator having negative voltage protection.

Referring now to FIG. 2, a circuit diagram depicts a synchronous Buck voltage regulator 26 having negative voltage protection. Regulator 26 has electrical components configured as a power stage 28 managed by a regulator controller 30. During normal operations a control MOSFET Q1 32, also known as the high-side MOSFET, and a synchronous rectification MOSFET Q2 34, also known as the low-side MOSFET, regulates voltage from input voltage (Vin) to output voltage (Vout). If regulator controller 30 detects an overvoltage event at Vout, then synchronous MOSFET Q2 34 is turned on by the low-side gate driver output DL being forced high to interface an inductor 36 capacitor 38 tank circuit with Vout. Capacitor 38 rapidly discharges to reduce the voltage at Vout, as indicated by the initial energy released path arrow 40. In some instances, the interfacing of the LC tank circuit results in a negative voltage at Vout. For instance, a negative voltage results from the output capacitor reversedly charged from the tank where a number of different conditions cause an overvoltage, such as a change in the reference voltage, component aging and feedback loop disconnecting, but a negative voltage does not occur if the overvoltage is caused by a short condition across MOSFET 32. Especially in the case when the buck regulator has a larger output capacitor 38 while using a lower on conducting resistance low side MOSFET 34 and light load, the negative voltage at V out can rapidly reach 2V, presenting a risk of damage to sensitive processing components. The conventional way to prevent the application of negative voltage to the processing components is to place a power schottky diode 42 across the output to act as a reverse-polarity clamp. However, the addition of a schottky diode to each regulator 26 adds to the cost of the system and takes up valuable printed circuit board space.

In order to reduce the risk of excessive negative output voltage at V out, regulator controller 30 includes a negative voltage protection MOSFET driver 42 that detects a negative voltage event and, if appropriate, turns off MOSFET 34 to prevent the negative voltage from reaching an excessive level. Negative voltage protection MOSFET driver 42 monitors Vin and the voltage at the switch pin LX to determine if the negative voltage event is associated with a failure across MOSFET 32 or a different condition. Damaged MOSFET 32 behaves as a short circuit so that a failure of MOSFET 32 is confirmed by determining the difference between V in and the voltage at pin LX is much less than a normal value or a comparison with ground. If a failure of MOSFET 32 is confirmed, negative voltage protection MOSFET driver 42 maintains an on value at pin DL to have MOSFET 34 continue to correct the overvoltage. If a condition other than a failed control MOSFET causes the overvoltage, and negative voltage protection MOSFET driver 42 detects a negative voltage, then negative voltage protection MOSFET driver 42 commands synchronous MOSFET 34 off. As a consequence, the current flow being reversely released into capacitor 38 is stopped and the remaining energy in the LC tank circuit is instead fed back to the input source at V in through the body diode of MOSFET 32, as is depicted by remaining energy release path arrow 44. Thus, if the negative voltage event is triggered by a failure across MOSFET 32, then negative voltage protection MOSFET driver 42 allows synchronous MOSFET 34 to maintain the LC tank circuit with V out under normal operating conditions that prevent an overvoltage. Otherwise, negative voltage protection MOSFET driver 42 turns off MOSFET 34 on detection of a negative voltage to correct the negative voltage event. For instance, negative voltage protection MOSFET driver 42 turns off MOSFET 34 if the overvoltage condition is associated with a change in reference voltage, component aging or feedback loop disconnection. After correction of the negative voltage, negative voltage protection MOSFET driver 42 allows regulator 26 to continue to manage the Vout with normal operations. Since power MOSFET failure implies short characteristics, in that overvoltage case output voltage will actually never reach negative voltage so another alternative approach is that once negative voltage protection MOSFET driver receive controller pin_FB sensed negative voltage it can command low-side MOSFET drive DL to turn off.

Figure 3:
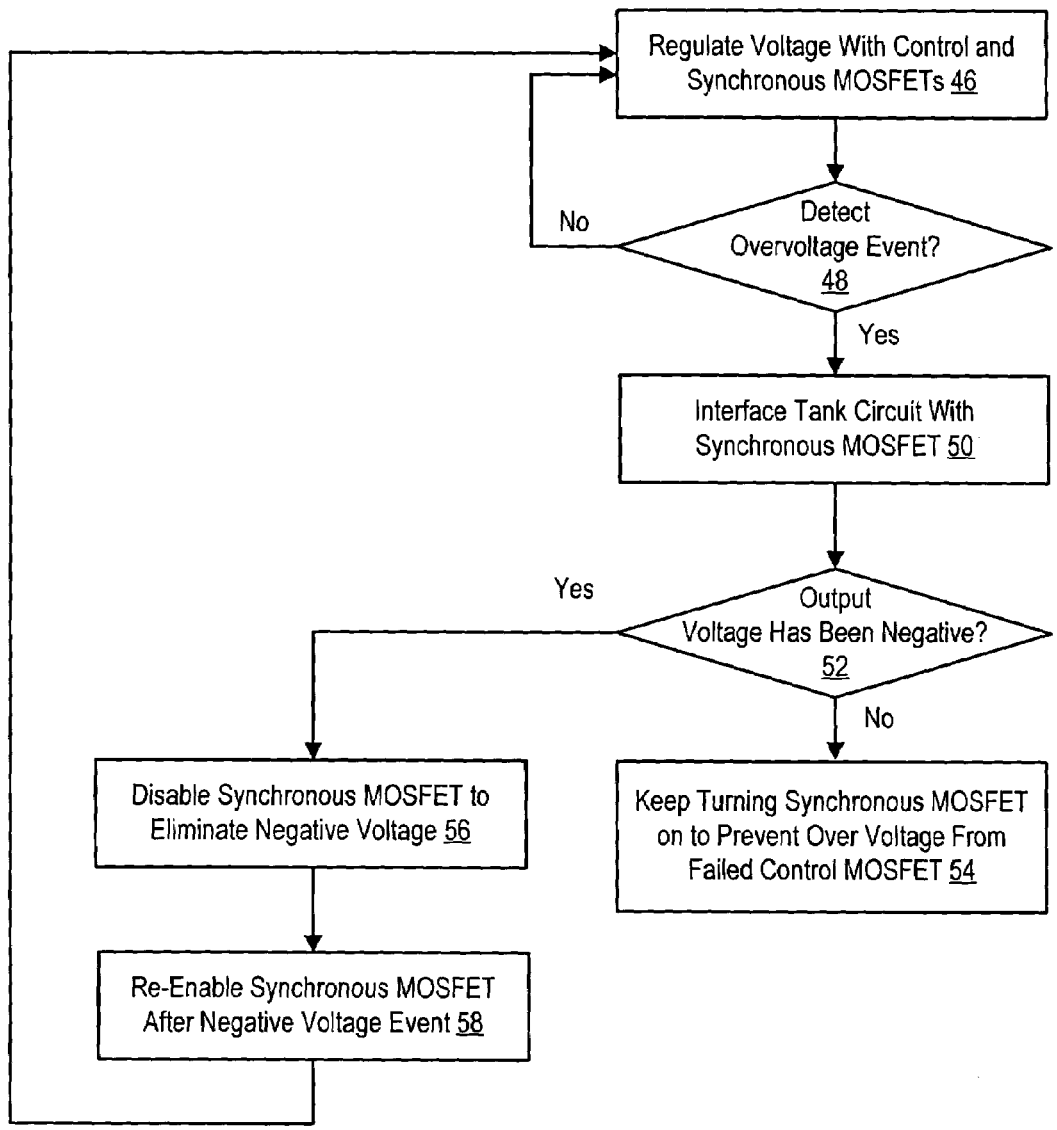
FIG. 3 depicts a flow diagram of a process for synchronous Buck voltage regulation with negative voltage protection.

Referring now to FIG. 3, a flow diagram depicts a process for synchronous Buck voltage regulation with negative voltage protection. The process begins at step 46 with regulation of voltage by a control MOSFET and synchronous MOSFET under a regulator controller. At step 48, if an overvoltage event is detected by the regulator controller the process continues to step 50, otherwise the process returns to step 46 for continuing voltage regulation. At step 50, the LC tank circuit is interfaced by the synchronous MOSFET with the output voltage to reduce the overvoltage. At step 52, a determination is made of whether a negative voltage event is detected due to the interfacing of the LC tank circuit in response to the overvoltage event. If a negative voltage is not determined, then overvoltage event was caused by a predetermined overvoltage condition, such as a short across the control MOSFET. If the overvoltage condition is a predetermined overvoltage condition, the process continues to step 54 for keeping synchronous MOSFET on to prevent overvoltage from predetermined severe overvoltage condition. In other words, at step 54 the synchronous MOSFET continues on to protect against overvoltage from the failed control MOSFET. If, at step 52, a negative voltage is detected when the synchronous MOSFET is turned on in response to an overvoltage, then the overvoltage event is associated with a predetermined overvoltage condition other than a failed control MOSFET, such as a change in reference voltage, component aging or feedback loop disconnection. The process continues to step 56 to turn off the synchronous MOSFET and decouple the interface of the LC tank circuit from the Vout and original energy release path to eliminate the negative voltage. At step 58, the synchronous MOSFET is re-enabled once the negative voltage event has passed to allow continued normal voltage regulation for a return to step 46. Alternatively at step 58 the control circuitry is latched up until a reset is performed on the controller.

Figure 4:
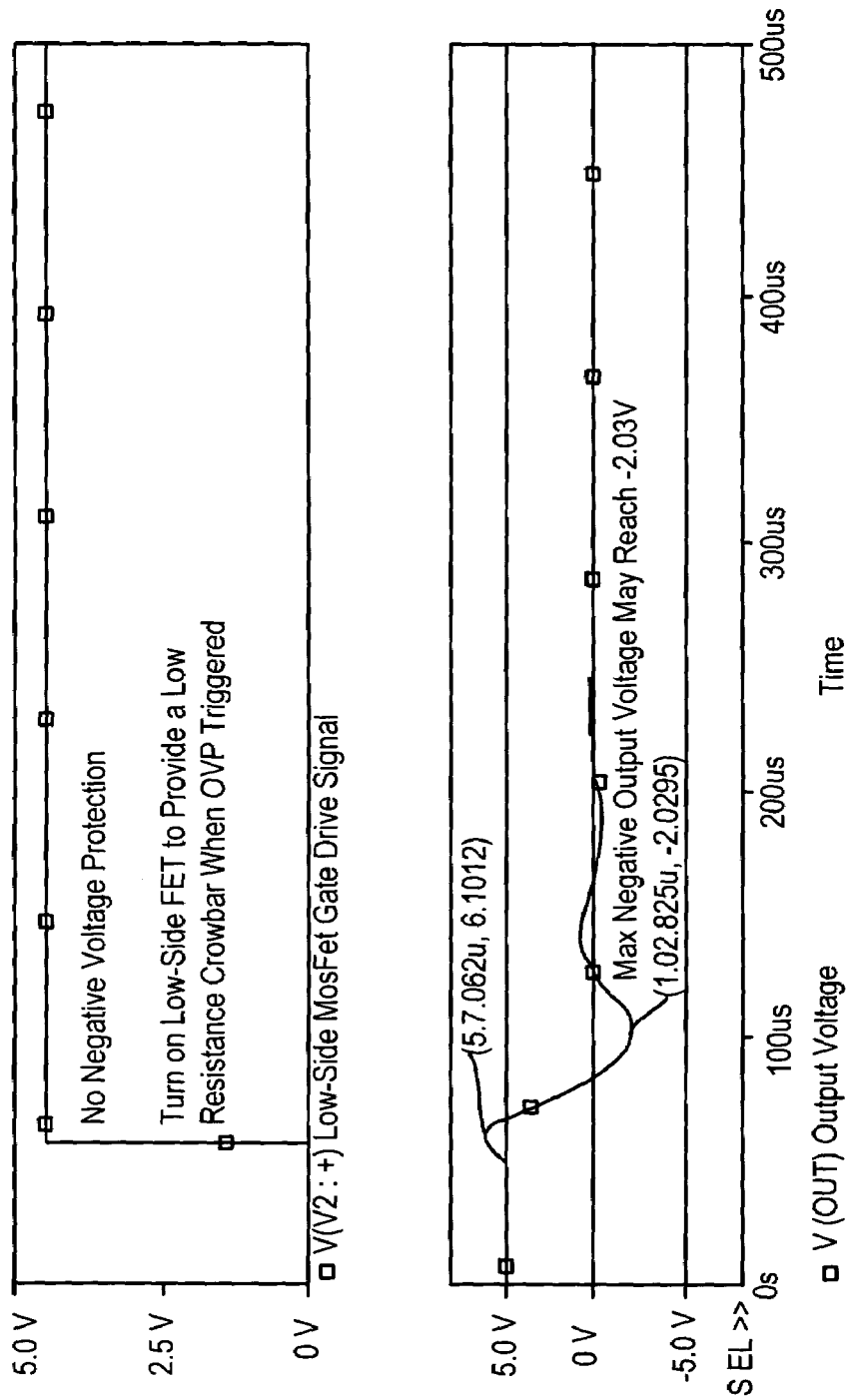
FIG. 4 depicts a response over time of a synchronous Buck voltage regulator to an overvoltage event.
Figure 5:
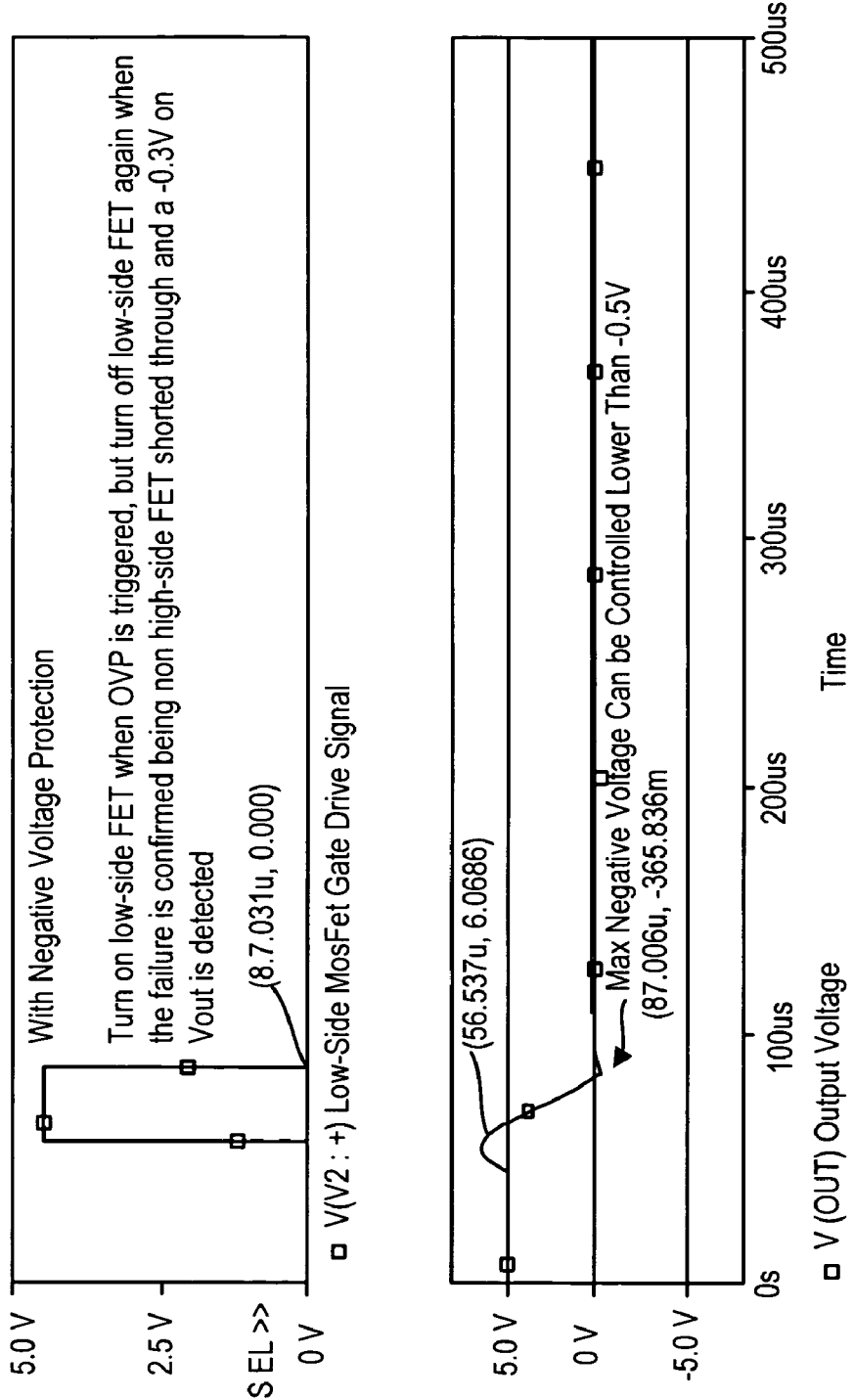
FIG. 5 depicts a response over time of a synchronous Buck voltage regulator to an overvoltage event with negative voltage protection.

Referring now to FIGS. 4 and 5, FIG. 4 depicts a response over time of a synchronous Buck voltage regulator to an overvoltage event and FIG. 5 depicts a response over time of a synchronous Buck voltage regulator to an overvoltage event with negative voltage protection. In FIG. 4, at the time of the overvoltage the low-side MOSFET is turned on to interface the capacitor with V out and thus reduce the voltage. The voltage turns negative where a fault is associated with a predetermined condition and reaches a maximum negative voltage of over 2 Volts before settling out. In FIG. 5, at the time of the overvoltage the low-side MOSFET is turned on to interface the capacitor, however, when the voltage turns negative so that the overvoltage condition is not a failed high-side MOSFET, the low-side MOSFET is turned off to release the capacitor from a reversely charged path with V out. The short time period it takes to check the overvoltage condition and disconnect the low-side MOSFET allows a slight negative voltage to occur, however the effect is minimal, such as the 0.3V indicated.

Although the present invention has been described in detail, it should be understood that various changes, substitutions and alterations can be made hereto without departing from the spirit and scope of the invention as defined by the appended claims.

What is claimed is:

1. An information handling system comprising:
   plural processing components operable to process information;
   a power supply operable to supply DC voltage to operate the processing components;
   at least one regulator interfaced between the power supply and at least one processing component, the regulator operable to interface a capacitor with the processing component and the power supply to reduce an overvoltage event;
   a regulator controller interfaced with the regulator and operable to detect an overvoltage event, the regulator controller selectively interfacing the capacitor if an overvoltage event is detected; and
   a negative voltage protection MOSFET driver operating on the regulator controller and operable to detect a negative voltage event following the interfacing of the capacitor, the negative voltage protection MOSFET driver further operable to remove the interface with the capacitor for a first overvoltage condition and to continue the interface with the capacitor for a second overvoltage condition.

2. The information handling system of claim 1 wherein the regulator comprises a control MOSFET operable to regulate voltage from a voltage in and a synchronous MOSFET operable to selectively interface the capacitor, the second overvoltage condition comprising a short across the control MOSFET.

3. The information handling system of claim 2 wherein the negative voltage protection MOSFET driver determines the negative voltage by comparing the voltage into the control MOSFET with the voltage out from the control MOSFET.

4. The information handling system of claim 1 wherein the first overvoltage condition comprises a change in reference voltage.

5. The information handling system of claim 1 wherein the first overvoltage condition comprises component aging.

6. The information handling system of claim 1 wherein the first overvoltage condition comprises a feedback loop disconnect.

7. The information handling system of claim 1 wherein the processing component comprises a CPU.

8. The information handling system of claim 1 wherein the processing component comprises a DDR memory module.

9. The information handling system of claim 1 wherein the processing component comprises a hard disk drive.

10. The information handling system of claim 1 wherein the regulator is a synchronous Buck regulator.

11. A method for regulating voltage to a component, the method comprising:
    regulating output voltage through a control MOSFET;
    monitoring the output voltage for an overvoltage event;
    interfacing a capacitor with the output voltage in response to the overvoltage event;
    monitoring the output voltage for a negative voltage event resulting from the interfacing of the capacitor; and
    removing the interfacing of the capacitor if the negative voltage event is associated with a predetermined overvoltage condition.

12. The method of claim 11 further comprising:
   determining that the overvoltage condition is a failed control MOSFET; and
   maintaining the interfacing of the capacitor.

13. The method of claim 12 wherein determining that the overvoltage condition is a failed control MOSFET further comprises comparing the voltage into the MOSFET and the voltage out of the MOSFET.

14. The method of claim 13 wherein the MOSFET and capacitor are configured as a synchronous Buck regulator.

15. The method of claim 11 further comprising providing the output voltage to an information handling system component.

16. A system for monitoring voltage to an electronic component, the system comprising:
   a synchronous Buck regulator having a control MOSFET operable to regulate voltage from an input voltage to an output voltage, an inductor-capacitor tank circuit interfaced with the output voltage and operable to discharge and reduce the output voltage, and a synchronous MOSFET operable to regulate the interface of the inductor-capacitor tank circuit with the output voltage;
   a regulator controller interfaced with the synchronous Buck regulator and operable to detect an overvoltage event at the output voltage, the regulator controller selectively engaging the synchronous MOSFET in response to the overvoltage event to reduce the overvoltage with the inductor-capacitor tank circuit; and
   a negative voltage protection MOSFET driver associated with the regulator controller and operable to detect if the overvoltage event is associated with a predetermined overvoltage condition, the negative voltage protection MOSFET driver operable to selectively enable or disable the interfacing of the inductor-capacitor tank circuit if the overvoltage event is associated with the predetermined overvoltage condition.

17. The system of claim 16 wherein the predetermined overvoltage condition comprises a failed control MOSFET, the negative voltage protection MOSFET driver maintaining the interfacing of the inductor-capacitor tank circuit.

18. The system of claim 16 wherein the negative voltage protection MOSFET driver determines the overvoltage condition is not a failed control MOSFET, the negative voltage protection MOSFET driver disabling the interfacing of the inductor-capacitor tank circuit during a negative output voltage.

19. The system of claim 16 wherein the system further comprises an interface to provide the output voltage to an information handling system processing component.

20. The system of claim 19 wherein the information handling system processing component comprises a CPU.

* * * * *